May 1, 1956  S. R. CROCKETT  2,743,576
PROPELLANT IMPELLED TURBINE
Filed Feb. 28, 1952

INVENTOR.
SYDNEY R. CROCKETT
BY
Edward C. Walsh
G. D. O'Brien
ATTORNEYS

United States Patent Office 2,743,576
Patented May 1, 1956

2,743,576

PROPELLANT IMPELLED TURBINE

Sydney Robert Crockett, China Lake, Calif., assignor to the United States of America as represented by the Secretary of the Navy Application February 28, 1952, Serial No. 274,043

4 Claims. (Cl. 60—35.6)

(Granted under Title 35, U. S. Code (1952), sec. 266)

The invention described herein may be manufactured and used by or for the Government of the United States of America for governmental purposes without payment of any royalties thereon or therefor.

The present invention relates to an acceleration sensitive motor for cameras, and more particularly to an acceleration sensitive motor that has a self-contained power supply for driving the camera mechanism.

In the field of rocket and missile testing, the dynamics of pre-flights or tract-restricted flights involves accelerations up to one hundred g's. Previously used cameras and their driving devices, mounted in missiles or on track vehicles for assessment work, are influenced by acceleration and deceleration; for example, a gunsight aiming point camera has a power requirement of twenty-four volts D. C. to drive the motion picture camera mechanism, which power is supplied by a battery weighing approximately five pounds. Since the battery is external of the unit it must be encased to withstand acceleration and deceleration forces. The governor and speed controls of these cameras are susceptible to acceleration and deceleration forces, thereby varying the film speed from approximately sixty-four frames per second while apparatus is at rest to five frames per second at thirty-five g's. The transportation of batteries plus the variable frame speeds make the prior systems cumbersome and unsatisfactory for missile and assessment work. The disadvantages encountered in prior art cameras are overcome by the present invention which maintains a constant speed for the film and the motion picture camera mechanisms so as to prevent the film speed from varying inversely with the acceleration of the camera unit. The present invention accomplishes this by utilizing a turbine, the torque of which varies directly with the acceleration of the camera unit, thereby maintaining a constant film speed.

An object of the present invention is to devise a camera or similar apparatus with a power supply that is self-contained and non-electrical.

Another object of the present invention is to devise a camera or similar apparatus with a power supply that has a fast initial response.

A further object of the present invention is to provide a camera or similar apparatus with a power supply that is compact, occupies a minimum of space and requires less maintenance than prior power supplies.

Other objects and many of the attendant advantages of this invention will be readily appreciated as the same becomes better understood by reference to the following detailed description when considered in connection with the accompanying drawing in which.

Figure 1:
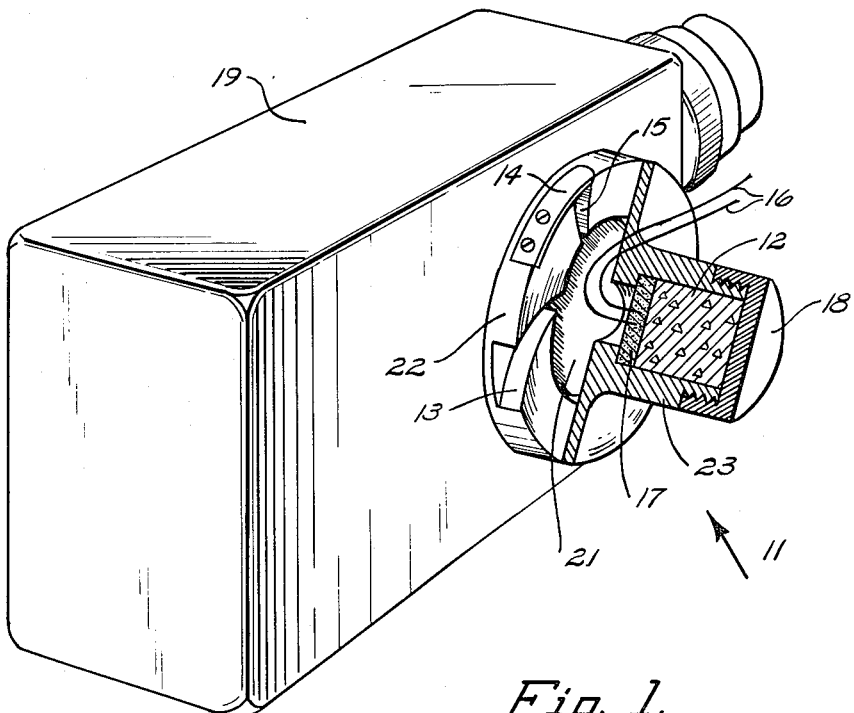
Fig. 1 illustrates a sectional view of a preferred embodiment of the present invention as used with a camera.
Figure 2:
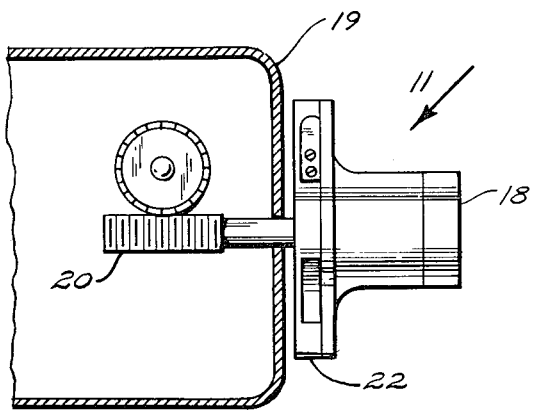
Fig. 2 is another view of the present invention illustrating the relationship and connection of the present invention to the driving mechanism of the camera.

Referring now to the drawing wherein like reference characters designate like or corresponding parts throughout the several views, there is shown in Fig. 1, a camera 19, provided with a motor assembly 11. The motor assembly comprises a container 23, containing a main slow-burning charge 12, a propellant booster 17, and a fine Nichrome wire 16, to ignite the booster charge. Connected to one end of the container and concentric with the motor axis is a rotor 22, encompassing a pressure chamber 21, which receives combustion gases from the container. Said rotor is provided with two main jet ports 13, placed 180° apart and angled off from the pressure chamber through the rotor to the rotor periphery at such angle as to impel the rotor when gases from the pressure chamber 21, are ejected through the ports at high velocity. Angled off from the rotor periphery in an opposite direction from the main thrust jets are control ports 15, provided with cantilever spring governors 14, which are secured to the periphery of the rotor to regulate the opening and closing of the control ports. A reloading cap 18, at the other end of the container 23, can be removed to insert a new propellant charge, after one has been burned. Rotation of the rotor is transmitted to the film in the camera through a worm gear unit 20, or similar means, as shown in Fig. 2. It will be understood that pressurized gases can be substituted for the above-mentioned combustible propellants.

With the foregoing in mind and referring to Figs. 1 and 2, the operation of the device is as follows:

When the booster propellant 17, and the main propellant 12, are ignited by heating the fine Nichrome wire 16, the gases generated from the combustion process are ejected at a high velocity from the pressure chamber through the jet ports into the ambient atmosphere, thereby impelling the rotor in a rotary direction. The rotation of the rotor drives the camera's film by means of the worm gear unit 20. Since the camera is mounted either in the missile or on track vehicles that carry the missile, the speed of the camera film will decrease as the unit accelerates, and increase as the unit decelerates.

Let us assume in the first instance that the camera unit and the missile are decelerating, thereby tending to cause an increase in the film frame speed, and putting a lesser load on the rotor. The rotor will thereby tend to speed up which increases the inertia moment at the governor spring 14, this spring then opens the control port 15, decreasing the pressure in the combustion chamber, thereby slowing down the burning rate of the propellant and decreasing the torque of the rotor while keeping its speed of rotation substantially constant. The control ports being at an opposite tangent to main jets tend to oppose any over-acceleration when the surplus gases are being exhausted through same.

When the camera unit and missile are accelerating, the film frame speed will tend to slow down due to the inertia, thereby putting a greater torque load on the rotor. The rotor will then tend to slow down, and thus decrease the inertia moment at the governor spring. The spring then closes down over the control port, increasing the pressure in the combustion chamber, thereby increasing the burning rate of the propellant and increasing the torque of the rotor while keeping its speed of rotation substantially constant.

It should be understood, of course, that the foregoing disclosure relates to only a preferred embodiment of the invention and that numerous modifications or alterations may be made therein without departing from the spirit and the scope of the invention set forth in the appended claims.

Having thus described the invention, what is claimed is:

1. A motor comprising a container for a combustible propellant; a pressure chamber connected to said container to receive therefrom combustion gases when the propellant is ignited; a turbine rotor connected to the chamber and driven by said gases; said rotor provided with control ports permitting gas to escape from the pressure chamber; and governor means responsive to the angular velocity of said rotor to control the extent of opening of said control ports to maintain the angular velocity of the rotor substantially constant.

2. A motor comprising a container for combustible propellants; a main propellant retained in said container; a faster burning booster propellant retained in the container so as to be ignited prior to the main propellant; a pressure chamber connected to said container to receive therefrom combustion gases when the propellants burn; a turbine rotor connected to the chamber and driven by said gases; said rotor provided with control ports for escape of gas from the chamber; governor means responsive to the angular velocity of the rotor to control the extent of opening of said control ports to thereby govern the angular velocity of said rotor.

3. A motor comprising a container for combustible propellants; a main slower burning propellant retained in said containers; a faster burning booster propellant retained in said container so as to be ignited prior to the main propellant; said container provided with a reloading cap for inserting propellant charges; a pressure chamber connected to the container to receive therefrom combustion gases when the propellants burns; a turbine rotor connected to said chamber; said turbine rotor provided with main jet ports angled off from the pressure chamber through the rotor to the rotor periphery so as to impel the rotor when gases from the pressure chamber flow through said jet ports; said turbine rotor provided with control ports angled off from the pressure chamber through the rotor to the rotor periphery in an opposite direction to the main jet ports; governor means responsive to the angular velocity of the rotor to control the opening of the control ports to thereby govern the angular velocity of said rotor.

4. A motor comprising a container for combustible propellants; a main slower burning propellant retained in said container; a faster burning booster propellant retained in said container and adapted to be ignited prior to the main propellant; said container provided with a reloading cap for inserting propellant charges; a pressure chamber connected to the container to receive therefrom combustion gases when the propellants burn; a turbine rotor connected to the chamber; said turbine rotor provided with main jet ports angled off from the pressure chamber through the rotor to the rotor periphery so as to impel the rotor when gases from the pressure chamber flow through said ports; said turbine rotor provided with control ports angled off from the pressure chamber through the rotor to the rotor periphery in an opposite direction to the main jet ports; governor means responsive to the angular velocity of the rotor to regulate the extent of opening of the control ports; said governor means comprising a cantilever spring to cover each control port opening at the rotor periphery.

References Cited in the file of this patent
UNITED STATES PATENTS

| | | |
|---|---|---|
| 1,750,401 | Goldberg et al. | Mar. 11, 1930 |
| 1,940,434 | Nistri | Dec. 19, 1933 |
| 2,213,768 | Merriman et al. | Sept. 3, 1940 |
| 2,457,236 | Hokett | Dec. 28, 1948 |
| 2,544,420 | Goddard | Mar. 6, 1951 |
| 2,545,703 | Orr | Mar. 20, 1951 |
| 2,581,276 | Mock | Jan. 1, 1952 |
| 2,592,938 | McNaught | Apr. 15, 1952 |